Sept. 19, 1961   J. M. MONEGATO   3,000,671
DUMPING CART
Filed Nov. 23, 1955
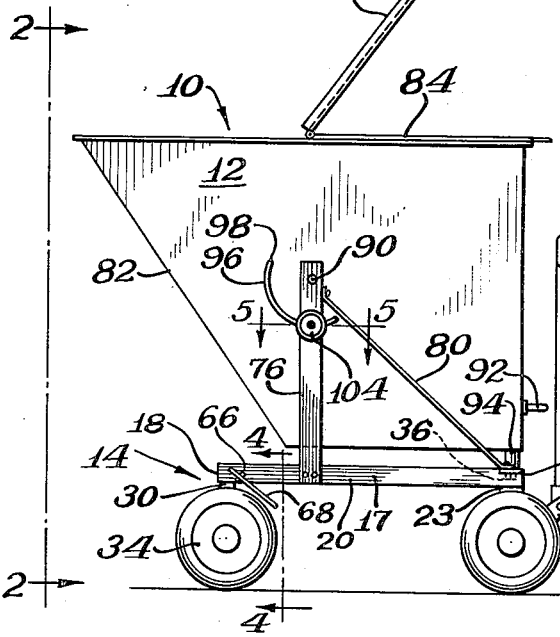
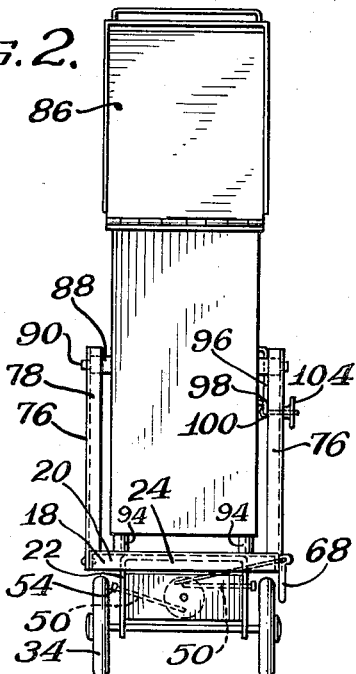
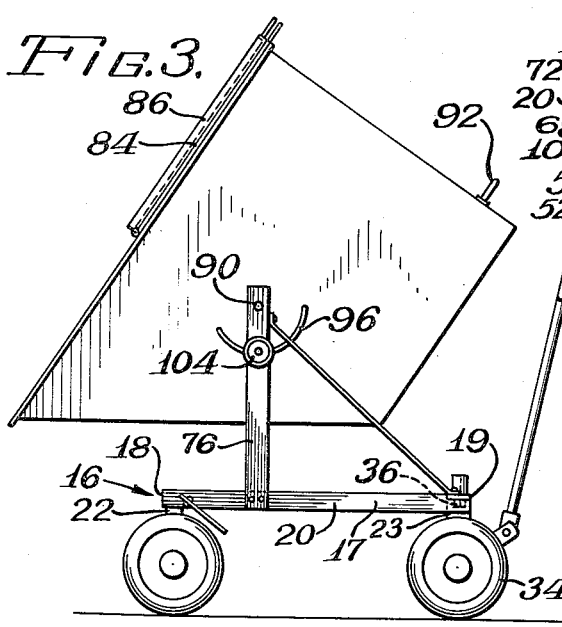
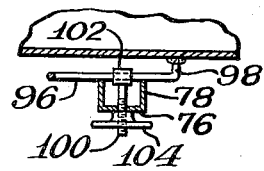
Inventor:
Joseph M. Monegato
By Howard N. Rogers Atty.

United States Patent Office 3,000,671
Patented Sept. 19, 1961

3,000,671
DUMPING CART
Joseph M. Monegato, 4157 Judd Ave., Schiller Park, Ill.
Filed Nov. 23, 1955, Ser. No. 548,711
3 Claims. (Cl. 298—2)

My invention relates to an improved dumping cart.

Industrial trash is generally heavy and formed in great quantities. Likewise, it is generally advisable that areas of industrial operation be kept clean for the several purposes of safety to personnel, fire prevention and accuracy of work. The location of trash barrels around machinery and work benches have been a common practice for the disposal of trash, but such barrels are difficult to empty.

My invention concerns a dumping cart which is well suited for the collection of such trash and wastes and likewise for the disposal thereof. It includes a wheeled undercarriage so that it may be easily moved from the collection area to the disposal area, as opposed to a barrow-type carriage. Braking means are provided on the wheels thereof so that the cart will not roll away from its desired location and likewise so that shovels or scoops may be employed in unloading the trash basket without the usual, highly irritating movement of the container with each thrust of the shovel. The trash basket proper is a top-opening, covered container which is mounted to be inclined at any angle from a normal trash receiving position to a full dumping position or any angle between for the most efficient reception of trash at any particular working site or for shovel or scoop unloading, where desired, without the likelihood of a considerable amount of trash falling out of the basket onto the floor.

My device enjoys the further advantages of being simply and inexpensively manufactured and of using a common rolling gear already in large production for the undercarriage of my cart.

Although my cart has been described in conjunction with the collection of industrial trash, it will be evident that there are many other uses possible to it, such as garden carts, laundry carts, etc.

Other objects and advantages of my invention will be apparent from the following description and drawings, of which:

FIG. 1 is a side elevation of a cart embodying my invention;

FIG. 2 is an end elevation thereof and may be regarded as being taken substantially from the line 2—2 of FIG. 1, looking in the direction of the arrows;

FIG. 3 is a side elevation of the cart of FIG. 1 showing, however, the basket of the cart in tilted position;

FIG. 4 is an enlarged elevation of the braking mechanism of my invention and may be regarded as being taken substantially along the line 4—4 of FIG. 1, looking in the direction of the arrows; and FIG. 5 is an enlarged fragmentary sectional view of the basket locking mechanism and may be regarded as being taken substantially along the line 5—5 of FIG. 1, looking in the direction of the arrows.

The illustrated cart 10 embodying my invention consists basically of a basket 12 and an undercarriage 14. The undercarriage 14 is constructed essentially on the wheels and framework of an ordinary child's wagon. I have found that such wagons are satisfactorily strong for my purposes, are easily moved, and only slight modifications are necessary to fit them to my purposes. Such utilization has of course a large economic advantage.

The undercarriage may consist of a rectangular frame 16 formed of two side angle irons 17, a rear angle iron 18 and a front plate member 19. The angle irons are oriented with vertical flanges 20 depending downwardly and horizontal flanges 21 extending inwardly. The frame members are desirably assembled by welding.

Rear and front wheel brackets 22, 23 are formed of strap metal bent into a channel section. The back 24 of the rear wheel bracket 22 is secured in fixed relation to the horizontal flange 21 of the rear frame member 18. The arms 30 of the bracket extend downwardly therefrom and are bored adjacent their ends to receive a wheel axle 32. Ordinary rubber-tired wagon wheels 34, such as are commonly used on children's wagons, are secured to the outstanding ends of the axle 32 in well-known fashion.

The front wheel mounting is similar to this except that the front wheel bracket 23 must be secured to the front frame member 19 to pivot thereon. To this end, the member 19 is flat, and the back of the bracket 23 is secured to its center by the single pivot pin 36. A tongue bracket 40 is secured to the wheel bracket 23 and mounts pivotally a pulling tongue 42. As this front wheel and tongue structure may be observed on any child's wagon, it is not thought necessary to illustrate it in detail.

A plate 44 is secured at its edges to the bracket arms 30 of the rear wheel bracket 22 to span the space between them, and a rotatable disk 46 is in turn secured to the plate 44 on an axle 48. A pair of brake rods 50 are secured at one end to the disk 46 and extend in opposite directions through bores 52 in the bracket arms so that the outer ends 54 thereof lie closely adjacent the rims of the rear wheels 34 or the tires mounted thereon. The outer ends 54 may have blocks of braking material 56 thereon to make more effective braking contact with the wheels 34 and to extend the area of bearing between the wheels and the rods 50.

The inner ends 58 of the rods are secured to the disk 46 on opposite sides of the center thereof and spaced from the center so that rotation of this disk in one direction will advance the rod ends 54 of both rods outward and rotation in the other direction will retract both ends. Thus, the left-hand rod 50 is secured to the disk 46 vertically above the center and right-hand rod 50 is secured to the disk 46 vertically below the center, in the position illustrated in FIG. 4. The inner end 58 of the rods may have a right-angle bend therein and pass through holes formed in the disk 46 and be secured therein by cotter pins. This is a conventional mode of attachment of a rod to a surface and detailed illustration is not necessary.

A third rod 60 is secured in like fashion at one end to the disk 46 and extends through holes drilled in the left-hand bracket arm 50 and the side frame member 18 and terminates in a similar right-angle bend 66.

A camming lever 68 is likewise provided which is formed of a flat plate formed to provide a handle 70 having a lateral bulge 72 off one end thereof. The outer end bend 66 of rod 60 is secured in a hole in the lever 68 opposite the bulge or cam 72, again by a cotter pin.

The back, unbulged side of the camming lever normally rests against the vertical flange of the side frame member 17. Upon swinging the handle 70 of the lever 68 of FIG. 4 upwardly, the rod 60 is drawn outward, so rotating the disk 46 and extending the braking rods 50 on either side until they make firm contact with the wheels 34, thereby locking the cart against movement.

A pair of channel members 76 are secured at their lower ends to the side pieces 17 of the frame 16 and extend upwardly therefrom, the flanges 78 of the channel members facing inwardly or toward each other. The channel members are formed of common channel stock having relatively thin flanges and therefore relatively sharp edges. The channel members may be braced by brace rods 80 extending from the top of the channel members down to the front part of the frame 16. The channel members have bores in their upper ends which support the basket 12.

The basket is formed generally of sheet metal and is rectangular in all respects save for an inwardly and downwardly sloping back end 82. It is desirably relatively high, but narrow so as to fit between the channel members 76. It should, however, be wide enough to accommodate a scoop for purposes of unloading. The purpose of the sloping back end 82 is to permit a placement of the basket close to the frame 16 of the undercarriage when the basket is upright while at the same time, permitting the basket's being tilted. Likewise, the sloping end permits an emptying of the basket by simply dumping the contents therefrom. The basket may have a cover 84 therefor which may include a hinged section 86. Alternatively, the cover may as well be slidable on the basket top or removable wholly therefrom.

The basket has a pair of studs 88 having reduced ends 90 extending from the sides thereof to mount the basket to the channel members 76, the reduced ends 90 passing through holes in the upper ends of the members 76 and secured externally by means of nuts, cotter pins, etc. To facilitate dumping, a handle 92 is secured to the front of the basket adjacent the lower edge thereof.

It will be appreciated that if the rear lower edge of the basket is situated rearwardly of the uprights 76 to any appreciable extent, the basket must be hung by the studs 88 somewhat above the level of the frame 16 when in upright position in order to permit the rotational movement thereof. A bumper 94 is provided on the front frame member 19 to level the basket at its front end. The bumper 94 may be simply an enlarged head of the pin 36 securing the front wheel bracket 36 to the frame 16.

It is desirable for purposes of unloading as well as for other purposes that the basket 12 of my cart be capable of being positioned at any angular position between the horizontal position illustrated in FIG. 1 and the full dumping position. Thus, when it is desired to dump a load, the rear end 82 should be capable of taking a sharply downward slope. On the other hand, when it is desired to unload the basket by scoop or shovel, the end 82 should be no more than parallel to the ground as illustrated in FIG. 3. When the basket is very full, it should even have an upward slant. Furthermore, in receiving trash, it may be convenient for a user to toss the trash into a container somewhat away from the working area. In such case, a slight downward tilt of the basket makes the top opening thereof a more easily hit target.

To meet this requirement of a variable tilt to the basket, I provide a rod formed into an arc 96 and having the ends 98 thereof bent over perpendicularly to the plane of the arc. The ends of the rod are secured to one side of the basket by welding or some similar means so that the arc 96 is concentric with the mounting studs 88 and stands away from but parallel to the side of the basket 12 to which it is secured so as to approach very closely the flanges 78 of the adjacent channel member 76. A second hole is formed in the channel member 76 downward of the hole accommodating the mounting stud 88, and an eye-bolt 100 extends therethrough, the eye 102 of the eye-bolt encompassing the arcuate rod 96 and the threaded end thereof extending through the hole in the channel member 76. A valve handle 104 is threaded on the threaded end of the eye-bolt and bears against the back of the channel member 76.

This structure, it will be noted, provides an exceedingly simple method for holding the basket at any desired position. By loosening the valve handle 104 the arcuate rod 96 may slide freely within the eye of the eye-bolt. When the valve handle is tightened, the eye-bolt draws the rod 96 tightly against the flanges 78 of the channel member 76, so locking the rod and the basket firmly against movement.

It will be evident from the foregoing description that I have provided a dumping cart simply and easily constructed, easily moved but containing provision for locking against movement. The basket thereof may be moved from an upright position in which a load is received to a full dumping position wherein the contents thereof may be dumped out, or any position between and the basket held in such position by a locking device which is certain, inexpensive and easily manipulated.

It will be apparent from the foregoing description that my device is capable of many different functions and that likewise there may be many modifications and alternatives in the construction thereof. I therefore desire that my invention be regarded as being limited only as set forth in the following claims.

I claim:

1. A dumping cart comprising a wheeled undercarriage, a pair of channel members having relatively sharp edged flanges secured to the sides of said undercarriage and extending upwardly therefrom, the flanges of said members facing each other, a basket pivotally mounted between the upper ends of said channel members, an arcuate rail secured to one side of said basket concentric with the point of pivotal attachment of said basket to the adjacent channel member and standing out from said side to be close to said member, an element extending through the back of said member and having an eye therein containing said rail and means at the other end of said element co-acting with the back of said member to urge said eye outwardly to draw said rail in locking engagement with the flanges of said member.

2. A dumping cart comprising a wheeled undercarriage, channel members extending upwardly from the sides of said undercarriage with the flanges thereof facing inwardly, said flanges having relatively sharp edges, a basket pivotally mounted in the upper ends of said members to be suspended thereby, an arcuate rail concentric with the point of pivotal attachment of said basket to one of said members secured to the side of said basket adjacent said member and spaced from said basket and next to said member, and means on said member encircling said rail to pull said rail into locking engagement with the edges of the flanges of said member.

3. In a dumping cart comprising an undercarriage, a pair of members secured to said undercarriage and extending upwardly therefrom, at least one of said members having a channel section with relatively sharp edged flanges facing inwardly, and a basket pivotally mounted between the upper ends of said members; means for locking said basket in any desired pivotal position comprising an arcuate rail secured to that side of said basket adjacent said channel member and concentric with the point of pivotal attachment of said basket to said channel member and standing out from said side to be close and parallel to said member, an element extending through the web of said member and having an eye therein containing said rail, and means at the other end of said element co-acting with the outside of said web to urge said eye outwardly to draw said rail into locking engagement with the flanges of said channel member.

References Cited in the file of this patent

UNITED STATES PATENTS

| D. 159,877 | Whiteman | Aug. 22, 1950 |
| 199,176 | Barlow | Jan. 15, 1878 |
| 391,554 | Parker | Oct. 23, 1888 |
| 395,504 | Nason | Jan. 1, 1889 |
| 600,464 | Webster et al. | Mar. 8, 1898 |
| 820,581 | LaLonde | May 15, 1906 |
| 1,015,969 | McCrary | Jan. 30, 1912 |
| 1,039,821 | Schaffer | Oct. 1, 1912 |

(Other references on following page)

UNITED STATES PATENTS

| | | |
|---|---|---|
| 1,354,111 | Kosenko | Sept. 28, 1920 |
| 1,542,877 | Harman | June 23, 1925 |
| 1,715,938 | Miller | June 4, 1929 |
| 1,727,271 | Burns | Sept. 3, 1929 |
| 1,832,523 | Berger | Nov. 17, 1931 |
| 2,419,786 | Meehan | Apr. 29, 1947 |
| 2,542,321 | Forss | Feb. 20, 1951 |
| 2,631,006 | Sick | Mar. 10, 1953 |
| 2,709,109 | Reyburn | May 24, 1955 |
| 2,848,602 | Post | Aug. 19, 1958 |

FOREIGN PATENTS

| | | |
|---|---|---|
| 791,239 | France | Dec. 6, 1935 |
| 402,161 | Germany | Oct. 1, 1924 |
| 226,929 | Great Britain | Jan. 8, 1925 |